United States Patent
Chiu

(12) 
(10) Patent No.: US 6,695,274 B1
(45) Date of Patent: Feb. 24, 2004

(54) MOUNTING DEVICE FOR A DISPLAY

(76) Inventor: Posen Chiu, No. 25, Sec. 3, Bauan St., Shulin City, Taipei Hsien (TW)

( * ) Notice: Subject to any disclaimer, the term of this patent is extended or adjusted under 35 U.S.C. 154(b) by 0 days.

(21) Appl. No.: 10/422,954

(22) Filed: Apr. 25, 2003

(30) Foreign Application Priority Data

Aug. 1, 2002 (TW) ........................ 91211834 U

(51) Int. Cl.⁷ .......................... E04G 3/00; A47G 29/00
(52) U.S. Cl. ................. 248/371; 248/284.1; 361/681
(58) Field of Search ................. 248/371, 183.3, 248/281.11, 284.1, 278.1, 276.1, 274.1, 917, 919; 361/681, 682

(56) References Cited

U.S. PATENT DOCUMENTS

| | | | | |
|---|---|---|---|---|
| 4,834,329 A | * | 5/1989 | Delapp ................. | 248/183.3 |
| 5,123,621 A | * | 6/1992 | Gates ................. | 248/281.11 |
| 5,713,549 A | * | 2/1998 | Shieh ................. | 248/284.1 |
| 5,738,316 A | * | 4/1998 | Sweere et al. ........ | 248/123.11 |
| 5,812,368 A | * | 9/1998 | Chen et al. ............ | 361/681 |
| 5,826,846 A | * | 10/1998 | Buccieri et al. ....... | 248/280.11 |
| 5,975,472 A | * | 11/1999 | Hung ................. | 248/278.1 |
| 6,012,693 A | * | 1/2000 | Voeller et al. ........ | 248/280.11 |
| 6,394,403 B1 | * | 5/2002 | Hung ................. | 248/276.1 |
| 6,478,275 B1 | * | 11/2002 | Huang ................ | 248/284.1 |
| 6,592,090 B1 | * | 7/2003 | Li ................... | 248/284.1 |
| 2003/0075653 A1 | * | 4/2003 | Li ................... | 248/274.1 |

* cited by examiner

*Primary Examiner*—Anita King
(74) *Attorney, Agent, or Firm*—Hunton & Williams LLP

(57) ABSTRACT

A mounting device includes a display-supporting mechanism pivoted to a stationary base, so as to be rotatable relative to the stationary base. The display-supporting mechanism includes a bracket, and parallel first and second arm units that extend between and that are pivoted to the stationary base and the bracket and that cooperatively define a gap therebetween. An urging unit is connected to the first and second arm units in such a manner that downward rotation of the display-supporting mechanism relative to the stationary base from an upper position to a lower position results in widening of the gap, which, in turn, results in deformation of the urging unit, thereby storing a restoring force in the urging unit to urge the display-supporting mechanism in an upward direction.

10 Claims, 16 Drawing Sheets

US 6,695,274 B1

MOUNTING DEVICE FOR A DISPLAY

CROSS REFERENCE TO RELATED APPLICATION

This application claims priority of Taiwan Application No. 91211834, filed on Jan. 8, 2002.

BACKGROUND OF THE INVENTION

1. Field of the Invention

The present invention relates to a mounting device, more particularly to a mounting device for a display.

2. Description of the Related Art

FIG. 1 shows a conventional mounting device for a display, and generally includes a stationary base 91, a display-supporting mechanism 9, and two torsion springs 94.

As illustrated, the stationary base 91 is mounted on a horizontally extending support 90, and is formed with opposite lower left and right pivot plates 92. The display-supporting mechanism 9 includes a bracket 99, and parallel first and second arm units 95,97. The bracket 99 is disposed above the stationary base 91 for mounting of a display (not shown) thereon, and is formed with opposite upper left and right pivot plates 981 that are disposed above and that are aligned with the lower left and right pivot plates 92, respectively. The first arm unit 95 includes parallel left and right arms 95" which are pivoted to the lower left and right pivot plates 92 about an upper pivot shaft 93", and the upper left and right pivot plates 981. The second arm unit 97 includes parallel left and right arms 97", which are pivoted to the lower left and right pivot plates 92 about a lower pivot shaft 93, and the upper left and right pivot plates 981 in such a manner that the left and right arms 95", 97" of the first and second arm units 95,97 are rotatable relative to the stationary base 91 between upper and lower positions. An adjacent pair of the left arms 95",97" of the first and second arm units 95,97 is spaced apart from each other by a gap (G). Each of the two torsion springs 94 is sleeved around a respective one of the pivot shafts 93,93", and has an intermediate section 941 biasing against the stationary base 91, and two opposite ends 942 secured respectively to two spring-holding elements 70 sleeved firmly on the pivot shafts 93,93".

Under this condition, rotation of the first and second arm units 95,97 relative to the stationary base 91 from the upper position to the lower position results in widening of the gap (G) between the first and second arm units 95,97, which, in turn, results in deformation of the torsion springs 94, thereby storing a restoring force in the torsion springs 94 to urge the first and second arm units 95,97 in a direction from the lower position to the upper position.

The aforesaid conventional mounting device is disadvantageous in that it requires the upper and lower pivot shafts 93", 93 and four spring-holding elements 70 for mounting of the torsion springs 94. In addition, mounting of the torsion springs 94 and the spring-holding elements 70 on the pivot shafts 93", 93 is relatively inconvenient.

SUMMARY OF THE INVENTION

Therefore, the object of this invention is to provide a mounting device for a display, which includes less components and which requires little assembly time so as to overcome the aforesaid disadvantages of the prior art.

A mounting device for a display according to the present invention includes a stationary bases a display-supporting mechanism, and an urging unit. The display-supporting mechanism extends upwardly from and is pivoted to the stationary base so as to be rotatable relative to the stationary base between upper and lower positions. The display-supporting mechanism includes a bracket that is disposed above the stationary base, and parallel first and second arm units that extend between and that are pivoted to the stationary base and the bracket and that cooperatively define a gap therebetween. The urging unit is disposed between the stationary base and the bracket, and is connected to the first and second arm units in such a manner that rotation of the display-supporting mechanism relative to the stationary base from the upper position to the lower position results in widening of the gap between the first and second arm units, which, in turn, results in deformation of the urging member, thereby storing a restoring force in the urging unit to urge the display-supporting mechanism in a direction from the lower position to the upper position.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
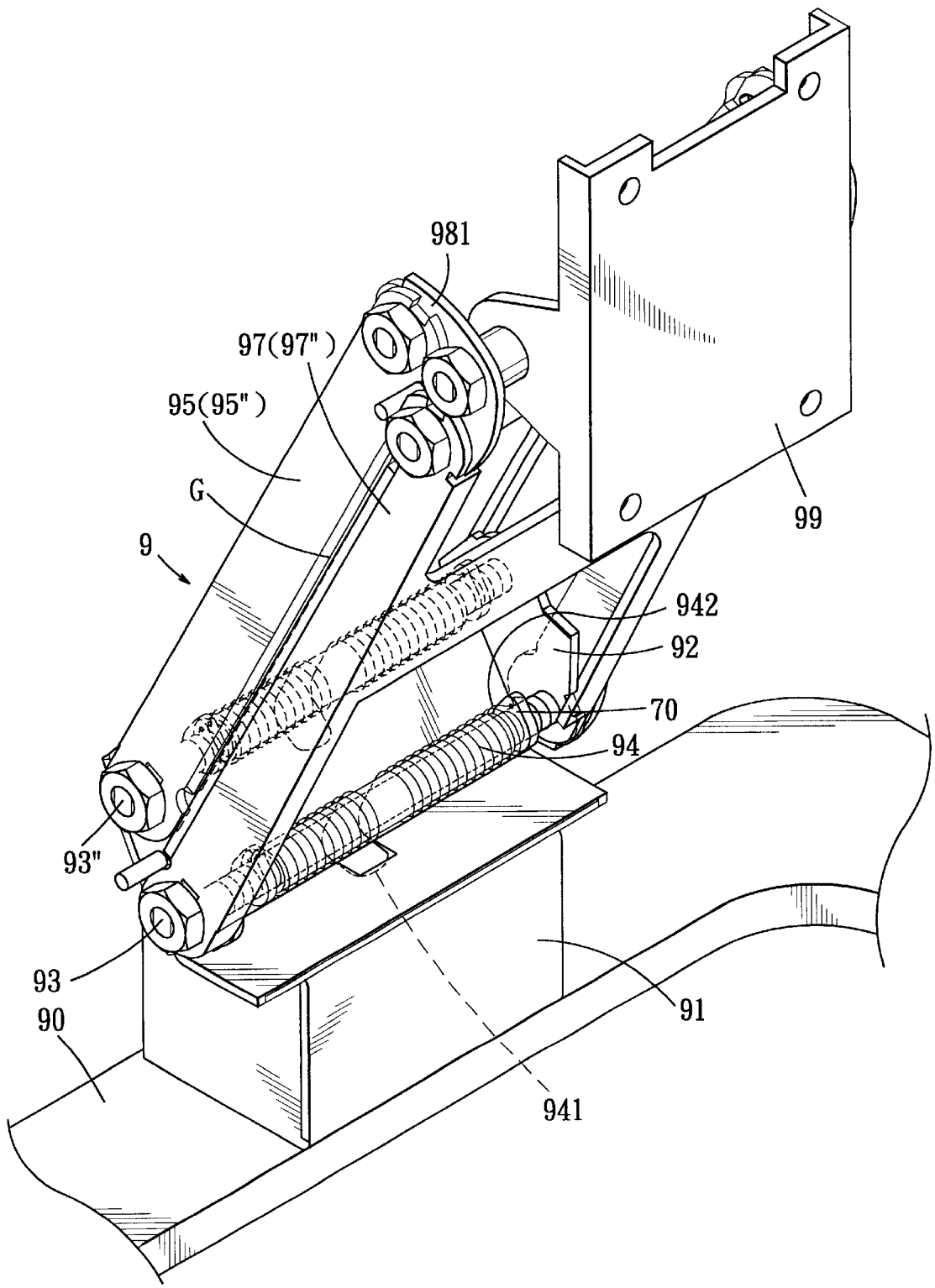
FIG. 1 is a perspective view of a conventional mounting device for a display.

Before the present invention is described in greater detail with reference to the following embodiments, it should be noted that same reference numerals have been used to denote similar elements throughout the specification.

Referring to FIGS. 2 to 6, the first preferred embodiment of a mounting device 100 for a display according to the present invention is shown to include a stationary base 3, a display-supporting mechanism (4,5), and an urging unit 49.

Figure 2:
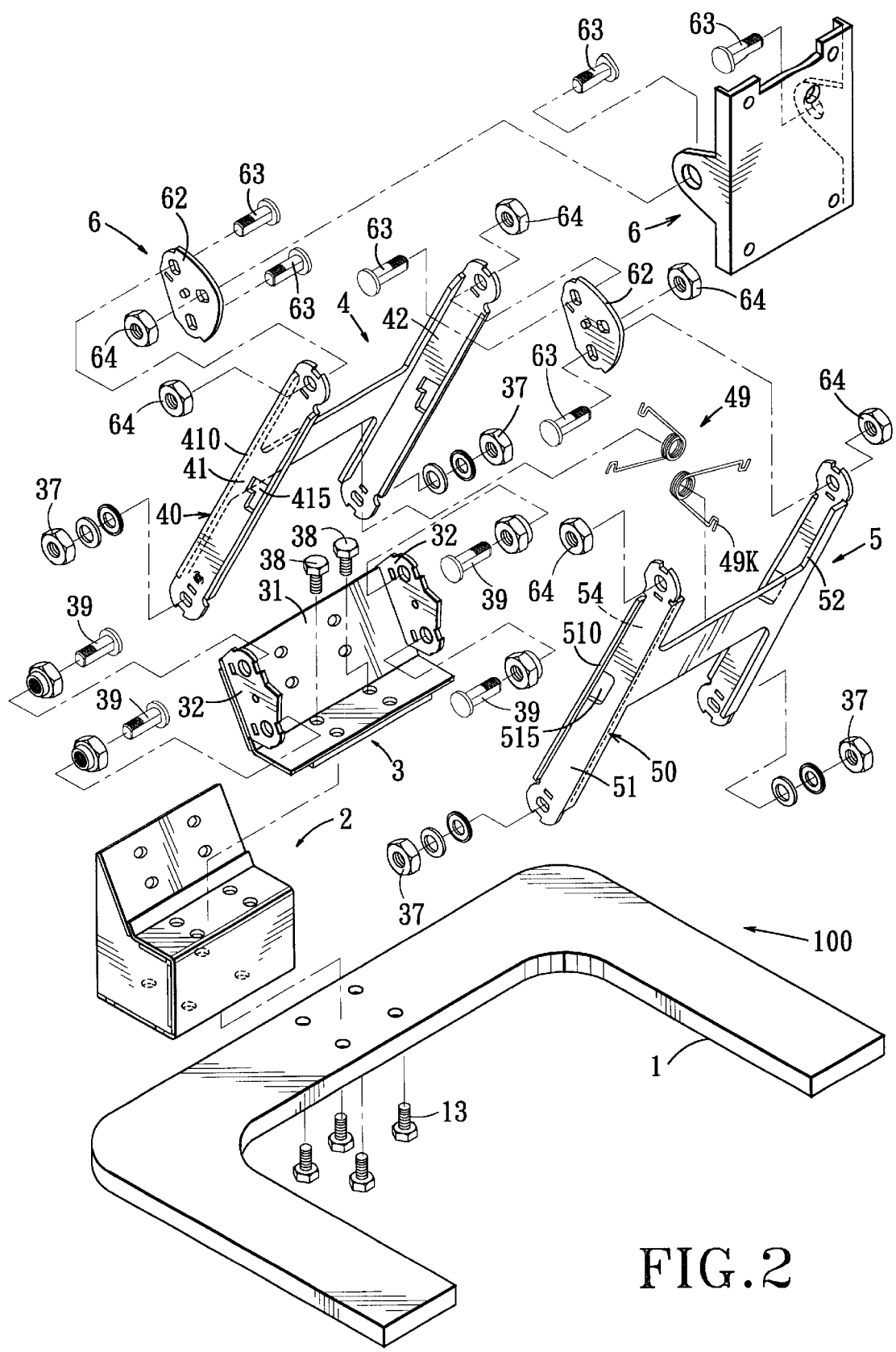
FIG. 2 is an exploded view of the first preferred embodiment of a mounting device for a display according to the present invention.
Figure 3:
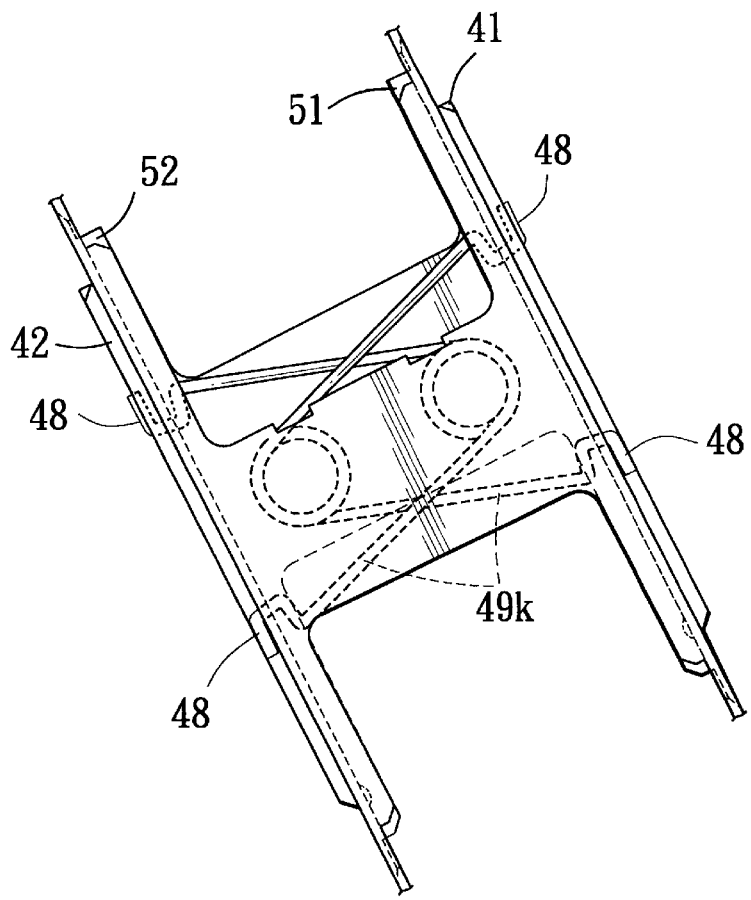
FIG. 3 is a fragmentary front view of the first preferred embodiment.
Figure 4:
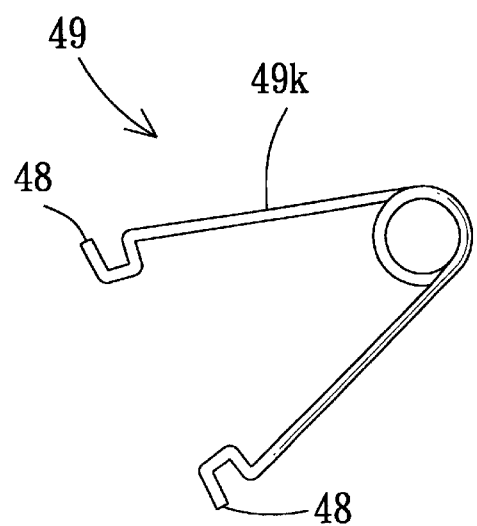
FIG. 4 is a schematic side view of an urging unit employed in the first preferred embodiment.
Figure 5:
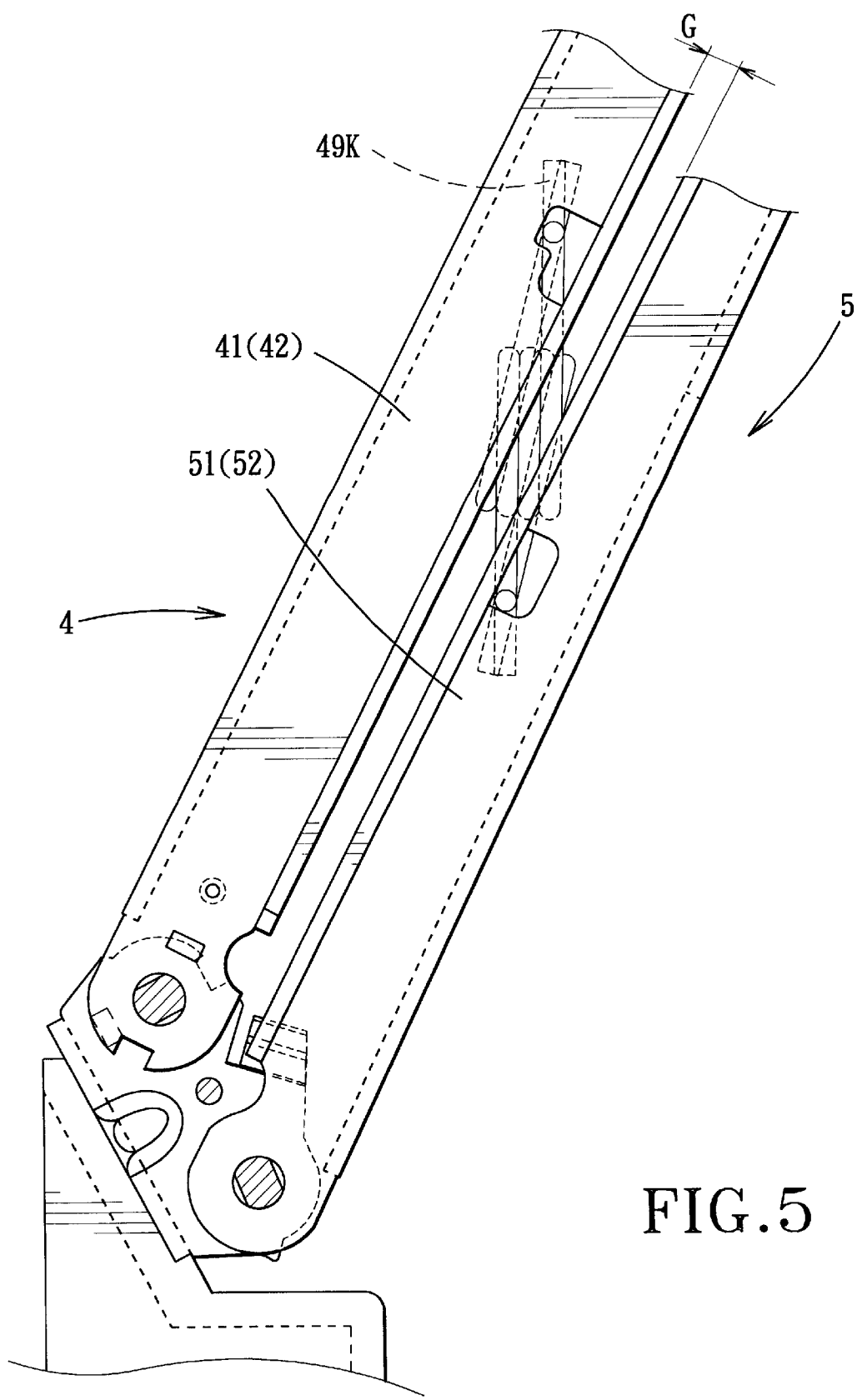
FIG. 5 is a side view of the first preferred embodiment.
Figure 6:
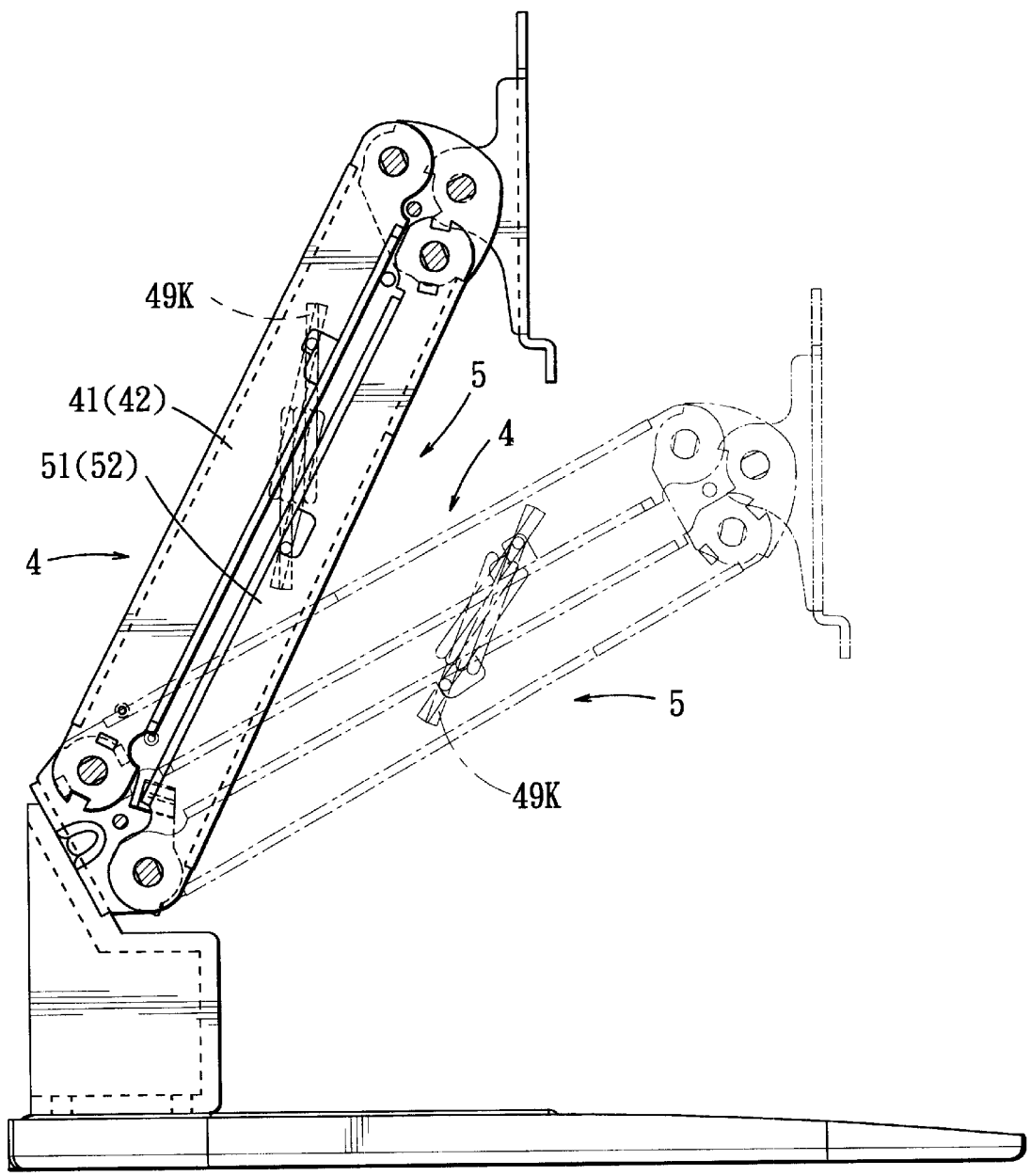
FIG. 6 is a schematic side view of the first preferred embodiment, illustrating how first and second arm units of the first preferred embodiment are moved from an upper position to a lower position.

As illustrated, the display-supporting mechanism (4,5) includes a bracket 6 and parallel first and second arm units 40,50 (see FIGS. 2 and 4). The bracket 6 is disposed above the stationary base 3. The parallel first and second arm units 40,50 extend between and are pivoted to the stationary base 3 and the bracket 6 in such a manner that the first and second arm units 40, 50 cooperatively define a gap (G) therebetween. The display-supporting mechanism (4,5) is rotatable relative to the stationary base 3 between upper and lower positions, as best shown in FIGS. 5 and 6.

The urging unit 49 is disposed between the stationary base 3 and the bracket 6, and is connected to the first and second arm units 40,50 in such a manner that rotation of the display-supporting mechanism (4,5) relative to the stationary base 3 from the upper position to the lower position results in widening of the gap (G), which, in turn, results in deformation of the urging unit 49, thereby storing a restoring force in the urging unit 49 to urge the display-supporting mechanism (4,5) in a direction from the lower position to the upper position.

In the first preferred embodiment, the stationary base 3 is mounted on a horizontally extending U-shaped support 1 via a mounting seat 2 by the use of fastener screws 13 and 38, and is formed with opposite lower left and right pivot plates 32. The bracket 6 is preferably formed with opposite upper left and right pivot plates 62 that are disposed above and that are aligned with the lower left and right pivot plates 32, respectively. The first arm unit 40 includes parallel left and right arms 41, 42. The second arm unit 50 includes parallel left and right arms 51,52. Each of the left arms 41, 51 extends between the left pivot plates 32,62 and is pivoted to the left pivot plates 32,62 by means of screw units 39 (37), 63 (64). Each of the right arms 42, 52 extends between and is pivoted to the right pivot plates 32,62 by means of screw units 39 (37), 63 (64). The left arms 41,51 of the first and second arm units 40,50 are aligned with and are spaced apart from each other by the gap (G). Engagement between the screw units 39(37),63 (64) and the left and right arms (41,42), (51,52) provides a frictional force which permits positioning of the left and right arms (41,42), (51,52) at a desired angle relative to the stationary base 3. Since the feature of the present invention does not reside therein, a detailed description thereof is omitted herein for the sake of brevity. In this embodiment, the urging unit 49 includes two torsion springs 49K, each having two opposite ends 48 (see FIG. 4) that are respectively connected to the left arms 41,51 of the first and second arm units 40,50. Each of the left arms 41, 51 of the first and second arm units 40,50 has a middle portion 410, 510 that is formed with an anchoring hole 415, 515. Each of the opposite ends 48 of the torsion springs 49K is formed with a barb that extends through the anchoring hole 415 (515) in a respective one of the left arms 41 (51) and that anchors at a periphery of the anchoring hole 415 (515) in the respective left arms 41(51) (see FIG. 3). The bracket 6 includes a display-holding frame 65 attached to the upper left and right pivot plates 62 through screw units 63 (64) for mounting of a display member (not shown) thereon. It is noted that, the pivot shafts and spring-holding elements of the prior art are not required in the preferred embodiment to mount the torsion springs 49k on the left and right arms (41,42), (51,52) of the first and second arm units 40,50. The opposite ends 48 of each of the torsion springs 49K can be easily compressed to move toward each other so as to be inserted into the anchoring holes 415 in the left and right arms (41,42) (51,52), thereby facilitating the spring mounting operation.

Figure 7:
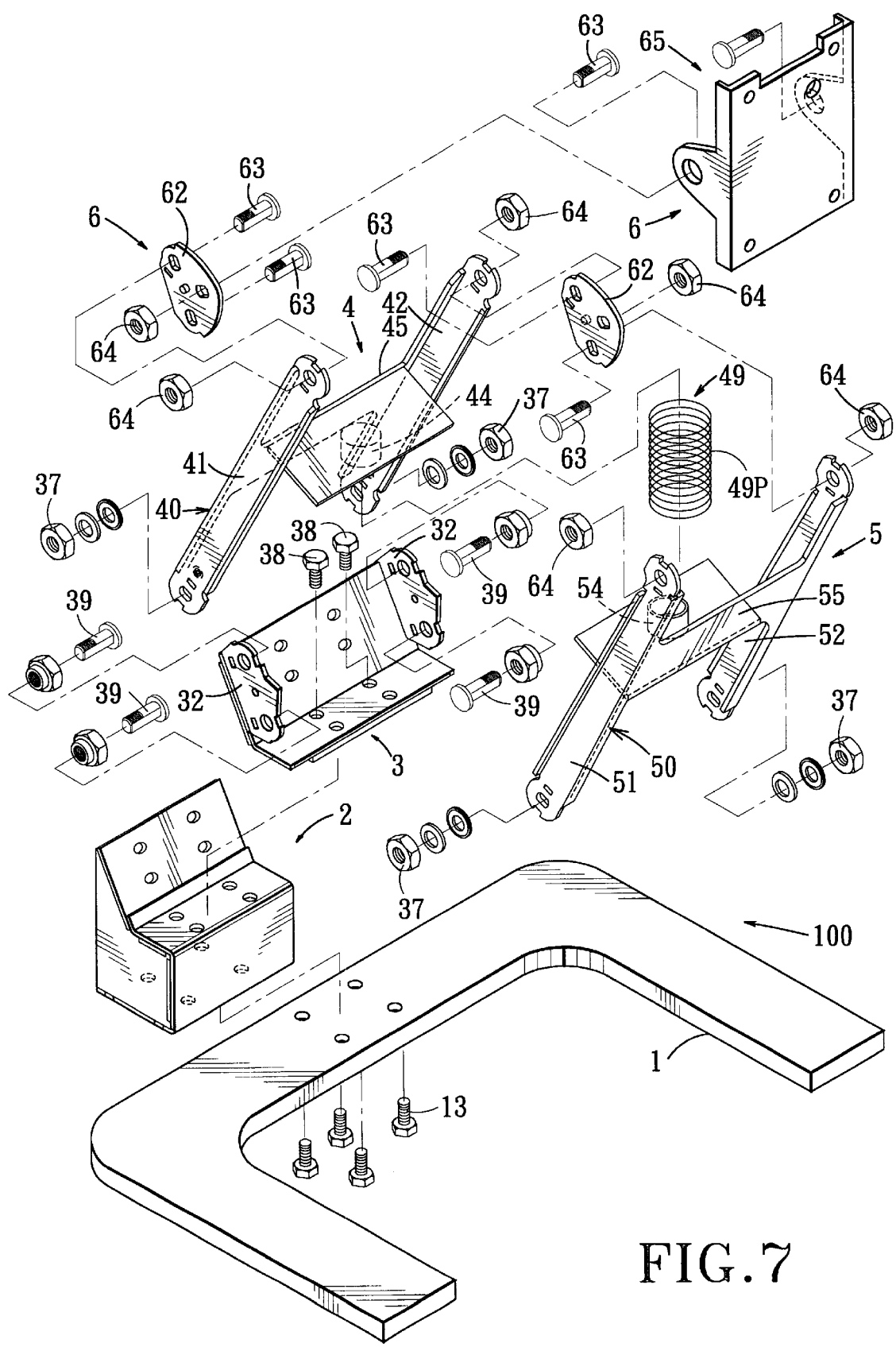
FIG. 7 is an exploded view of the second preferred embodiment of a mounting device for a display according to the present invention.
Figure 8:
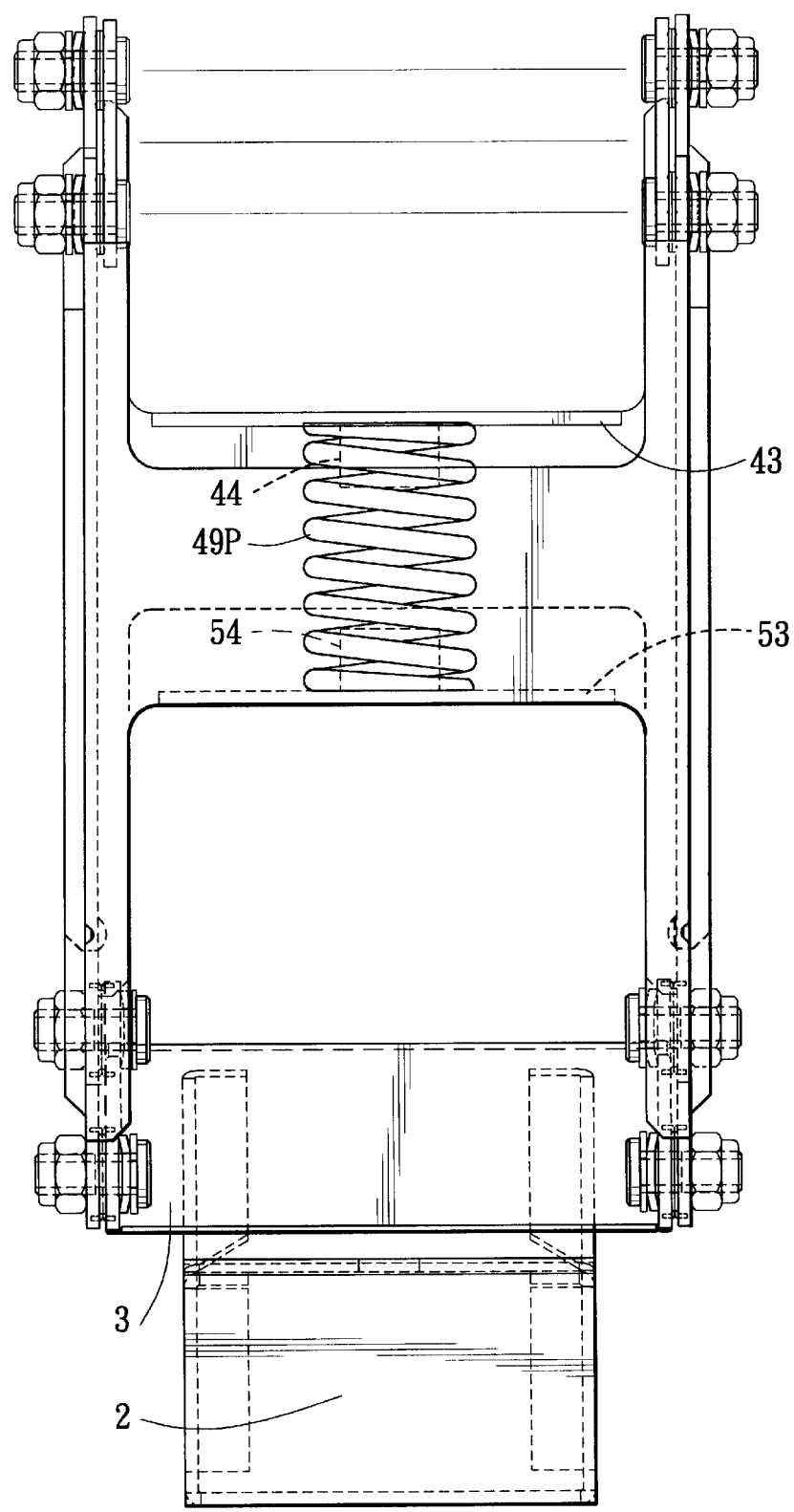
FIG. 8 is a schematic front view of the second preferred embodiment.
Figure 9:
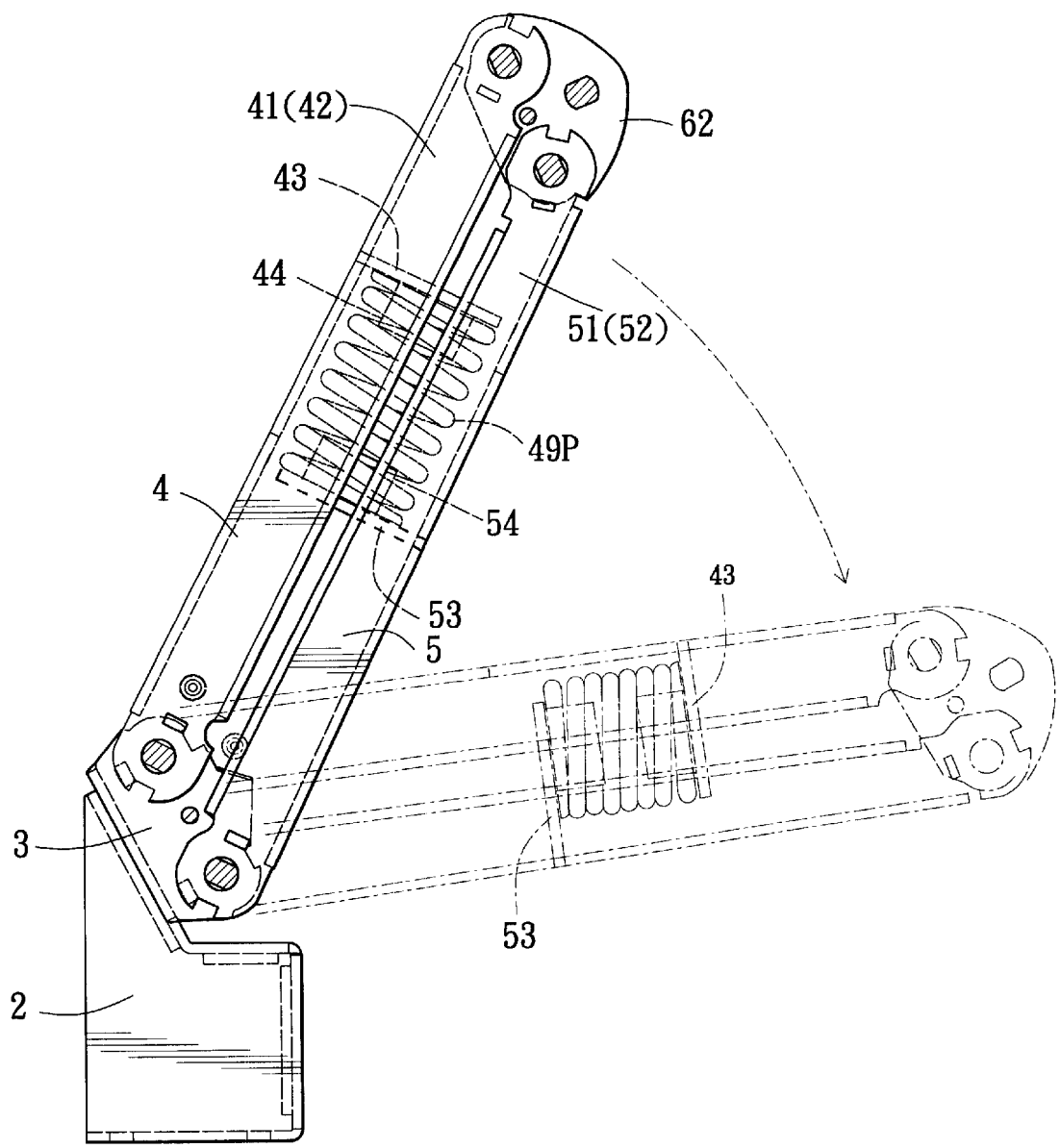
FIG. 9 is a schematic side view of the second preferred embodiment, illustrating how the first and second arm units of the second preferred embodiment are moved from an upper position to a lower position.

Referring to FIGS. 7 to 9, the second preferred embodiment of a mounting device according to the present invention is shown to have a construction similar to that of the previous embodiment. The main difference resides in that the first arm unit 40 further includes a first connecting rib 45 that interconnects the left and right arms 41,42 of the first arm unit 40, and an upper mounting plate 43 that projects from the first connecting rib 45 toward the second arm unit 50 in a transverse direction transverse to the left and right arms 41 (51), 42 (52) of the first and second arm units 40,50. The second arm unit 50 further includes a second connecting rib 55 that interconnects the left and right arms 51,52 of the second arm unit 50, and a lower mounting plate 53 that projects from the second connecting rib 55 toward the first arm unit 40 in the transverse direction. The upper and lower mounting plates 43,53 of the first and second arm unit 40,50 cooperatively define a spring-mounting space therebetween, and are respectively formed with upper and lower studs 44, 54 that project into the spring-mounting space toward each other. In this embodiment, the urging unit 49 includes a compression spring 49P (see FIG. 8) that is sleeved on the upper and lower studs 44,54 and that abuts against the upper and lower mounting plates 43,53 in such a manner that the compression spring 49P is compressed to store a restoring force when the first and second arm units 40,50 are turned to the lower position (shown by dotted lines in FIG. 9).

Figure 10:
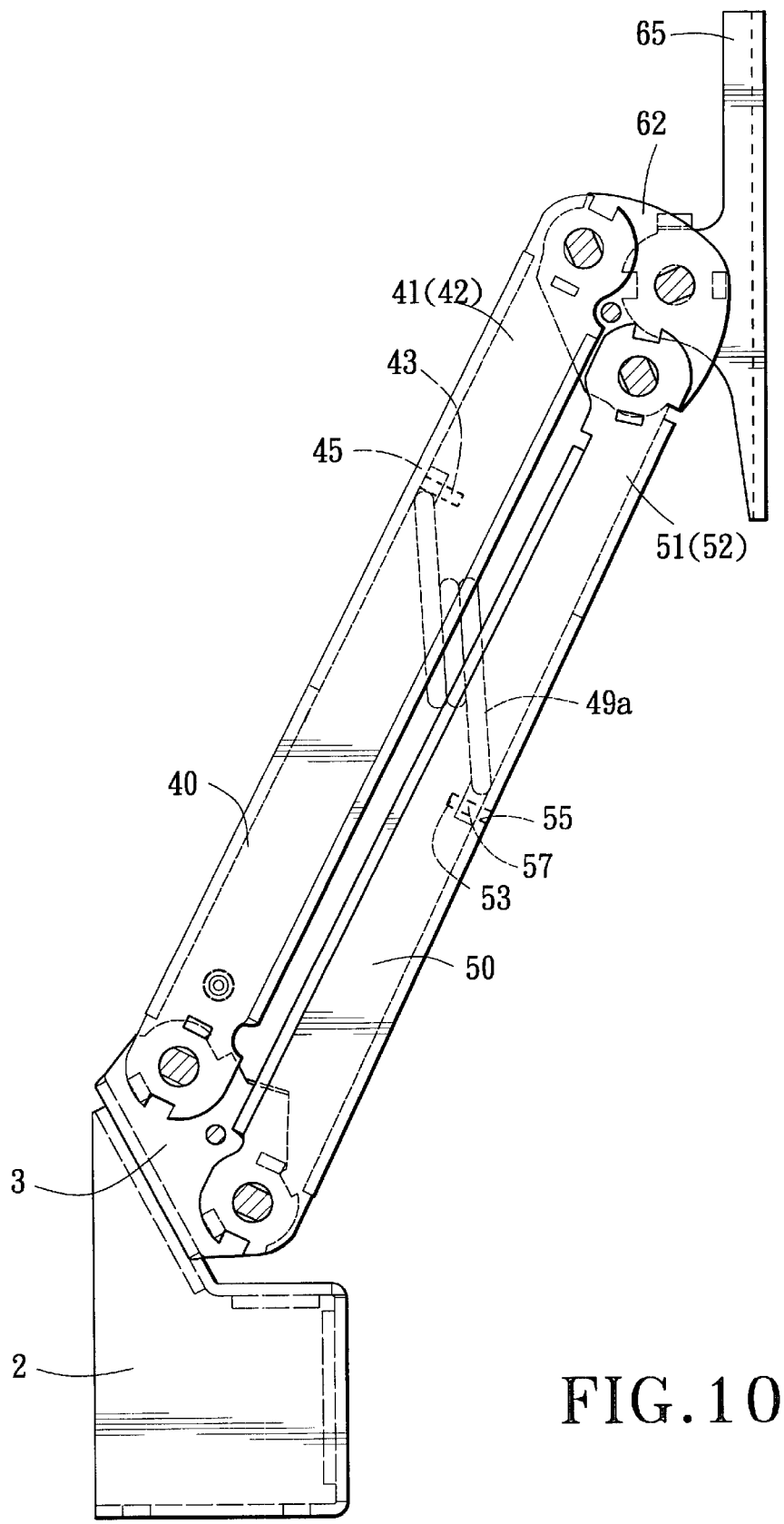
FIG. 10 is a schematic side view of the third preferred embodiment of a mounting device for a display according to the present invention.
Figure 11:
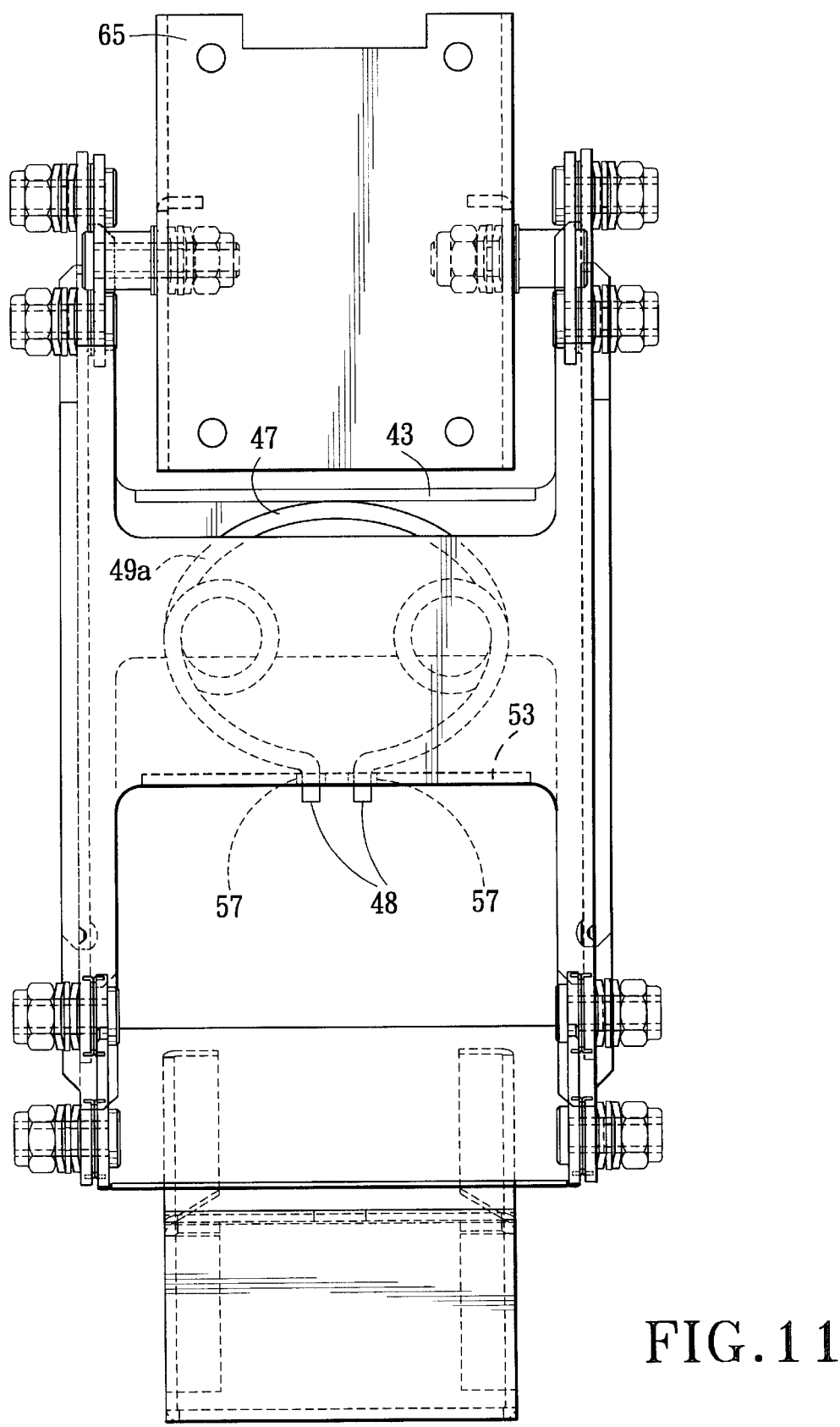
FIG. 11 is a schematic front view of the third preferred embodiment.
Figure 12:
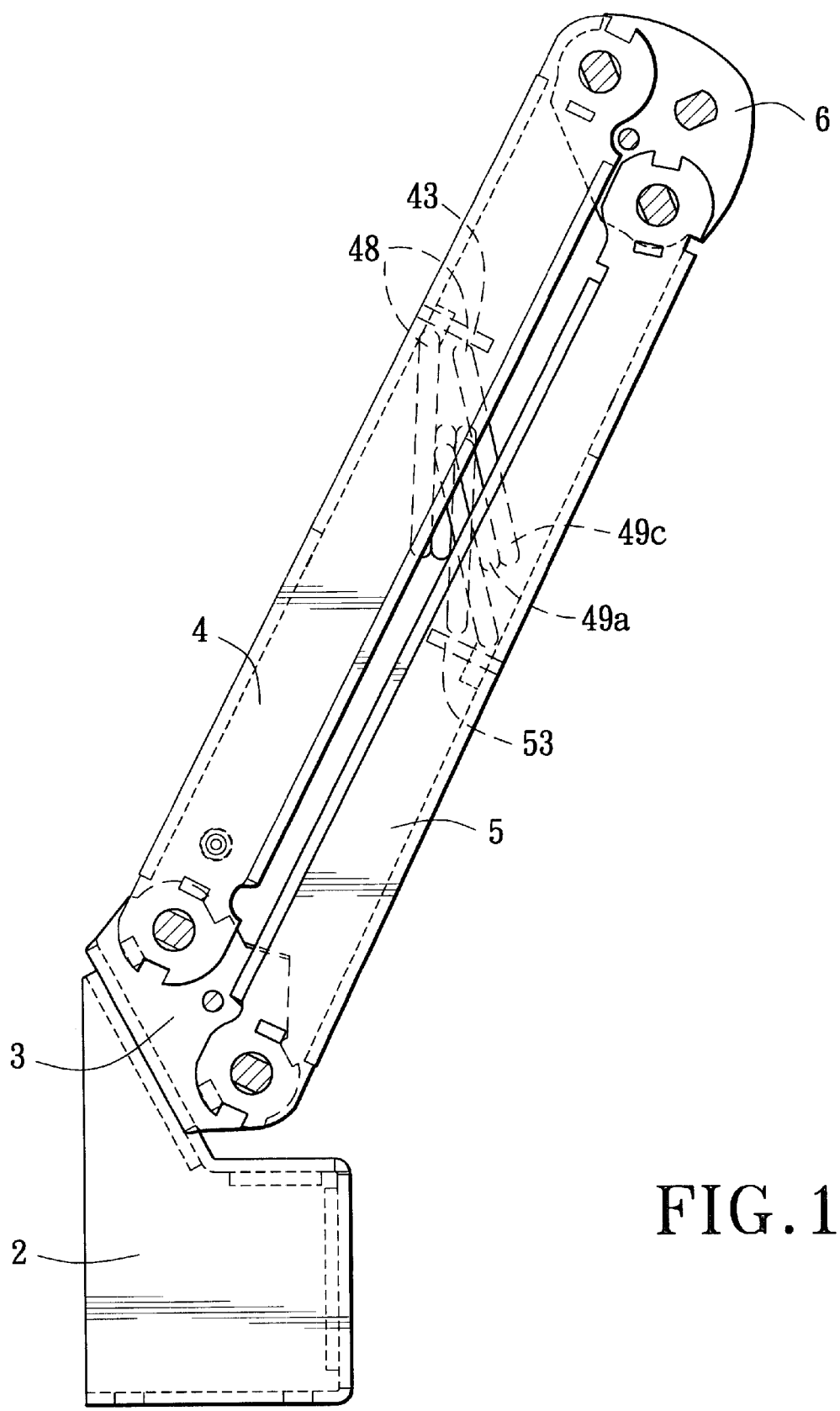
FIG. 12 is a schematic side view of the third preferred embodiment.

Referring to FIGS. 10 and 11, the third preferred embodiment of a mounting device according to the present invention is shown to have a construction similar to that of the second preferred embodiment. The main difference resides in that the urging unit 49 includes a torsion spring 49a that has two opposite ends 48 secured to two engaging holes 57 in the lower mounting plate 53, and a middle section 47 extending from the opposite ends 48 and abutting against the upper mounting plate 43 of the first arm unit 40, as best shown in FIG. 11. The urging unit 49 may further include a second torsion spring 49c that has two opposite ends 48 secured to two engaging holes in the upper mounting plate 43, and a middle section extending from the opposite ends 48 of the second torsion spring 49c and abutting against the lower mounting plate 53 of the second arm unit 50, as best shown in FIG. 12.

Figure 13:
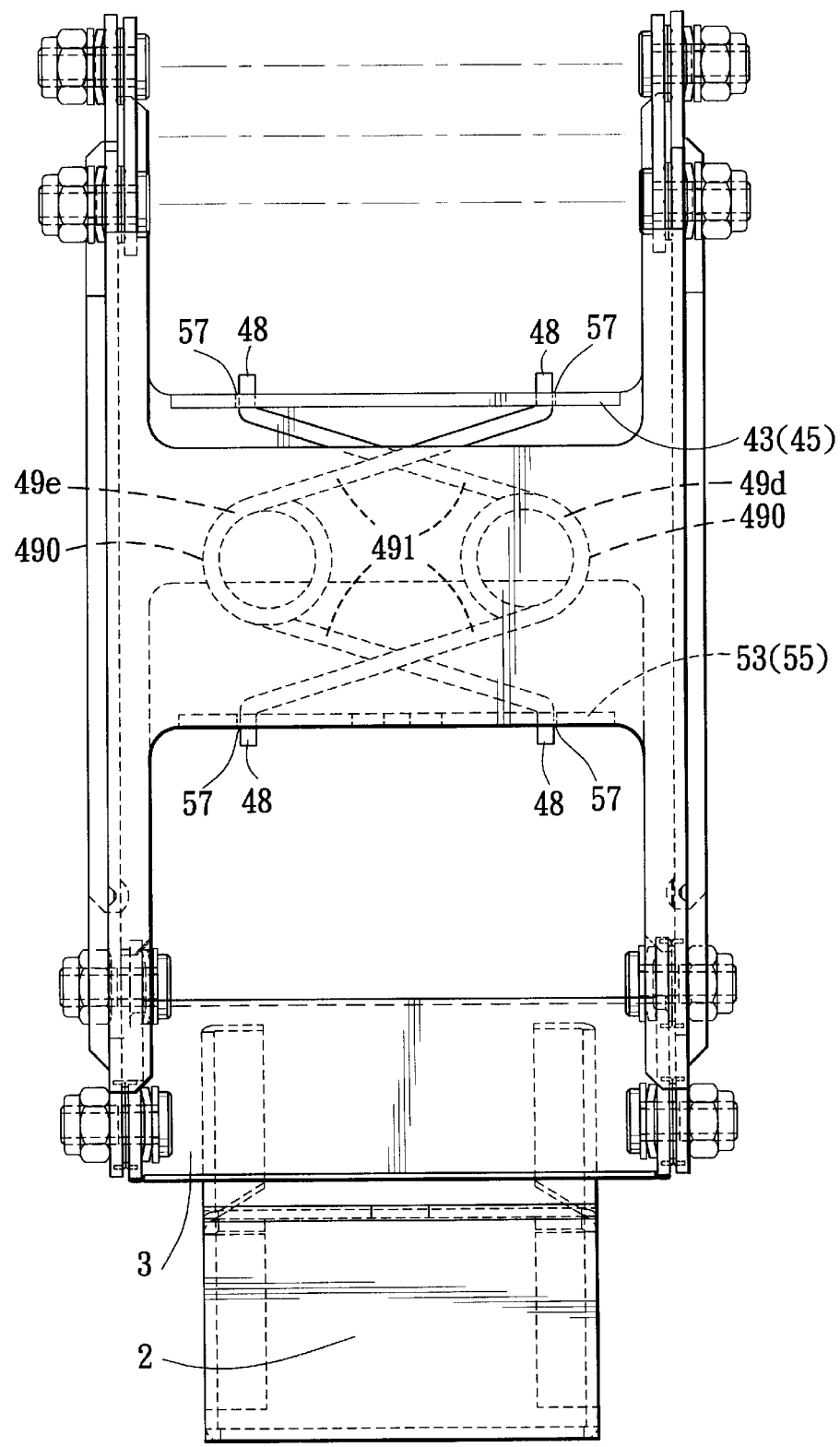
FIG. 13 is a schematic front view of the fourth preferred embodiment of a mounting device for a display according to the present invention.
Figure 14:
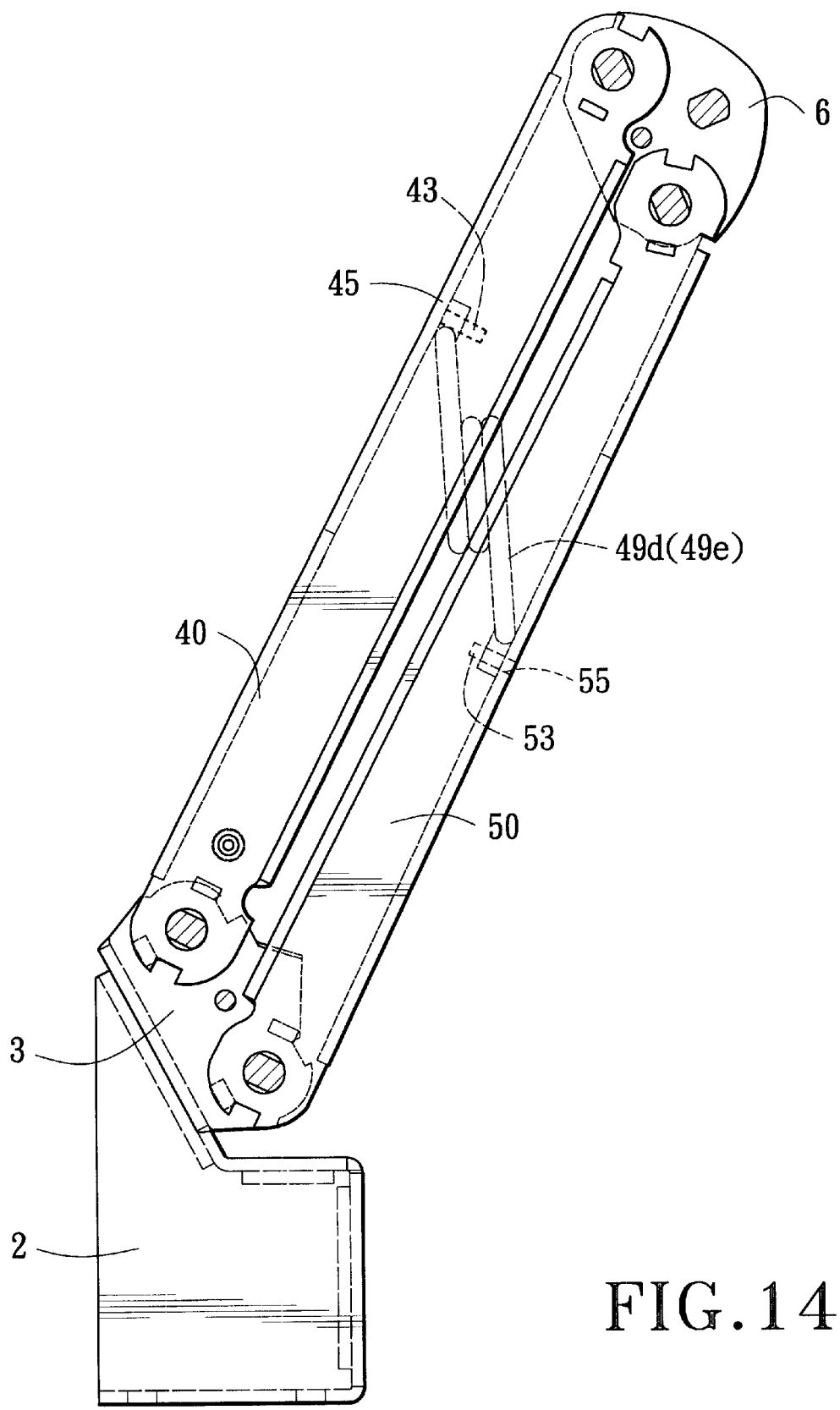
FIG. 14 is a schematic side view of the fourth preferred embodiment.
Figure 15:
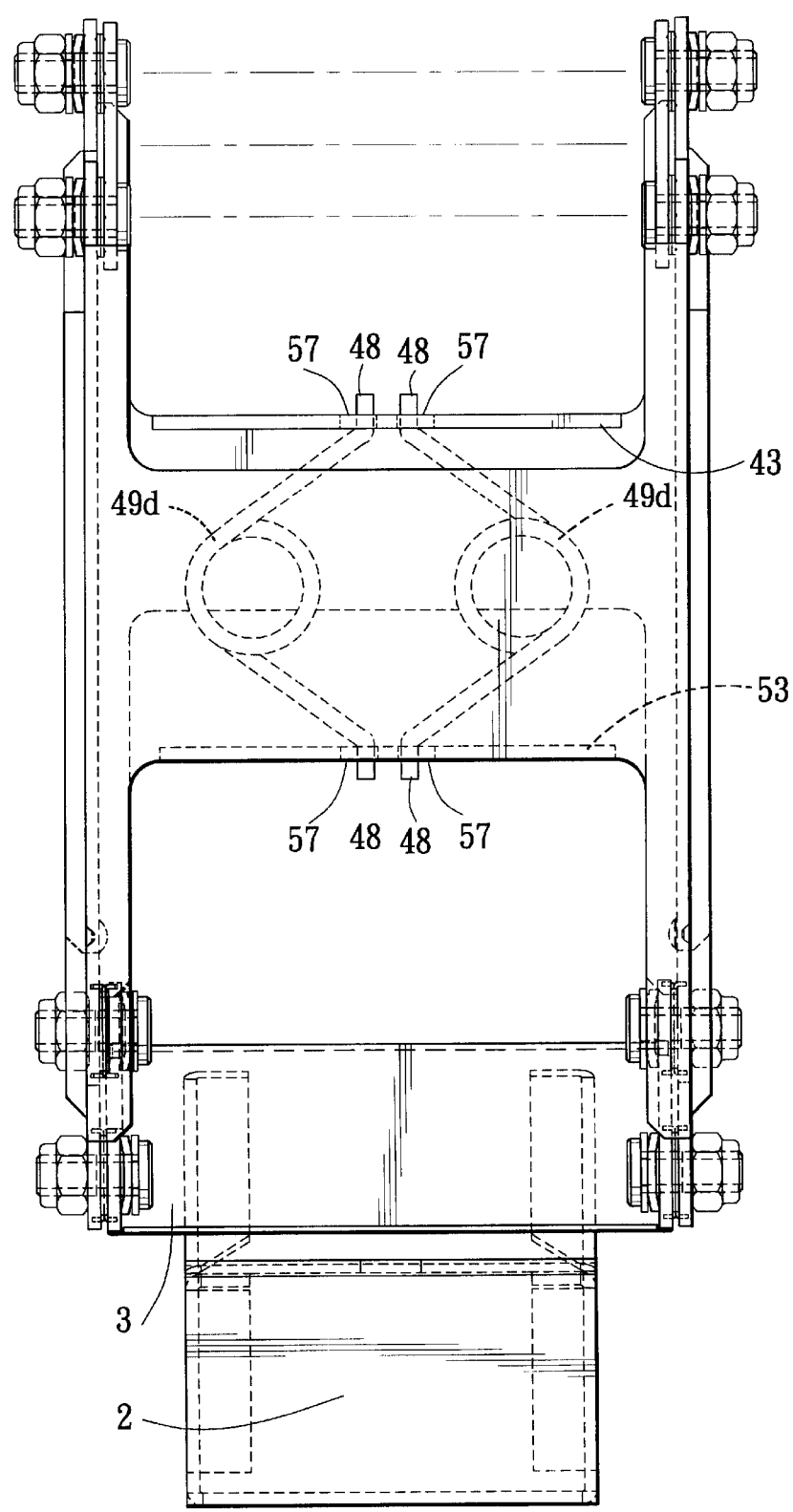
FIG. 15 is a schematic front view of a modification of the fourth preferred embodiment shown in FIG. 13.

Referring to FIGS. 13 and 14, the fourth preferred embodiment of a mounting device according to the present invent is shown to have a construction similar to that of the third preferred embodiment. The main difference resides in that the urging unit 49 includes a pair of torsion springs (49d, 49e), each of which has two opposite ends 48 that respectively extend through and that are respectively secured to engaging holes 57 in the upper and lower mounting plates 43,53. Preferably, each of the torsion springs 49d, 49e has a middle section 490 and two opposite end sections 491 that diverge from the middle section 490 (see FIGS. 13 and 15). More preferably, each of the opposite end sections 491 of one of the torsion springs 49d intersects a respective one of the opposite end sections 491 of the other of the torsion springs 49e (see FIG. 13).

Figure 16:
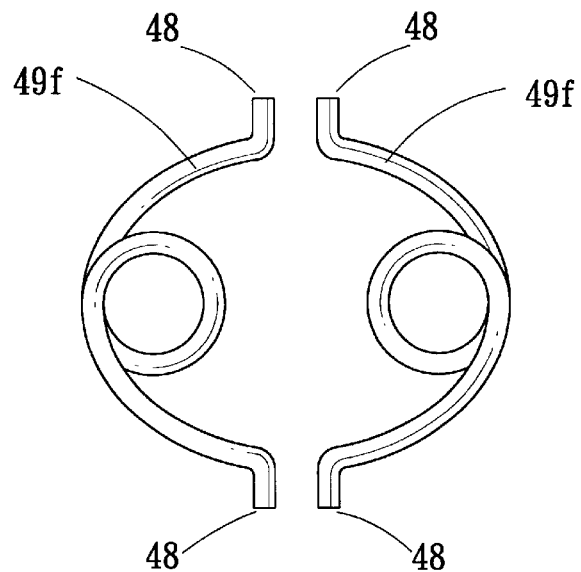
FIG. 16 illustrates two torsion springs for interconnecting the first and second arm units in the embodiments of the present invention.

FIG. 16 shows two torsion springs 49f of another configuration for interconnecting the upper and lower mounting plates 43,53 of the first and second arm units 40,50 in the embodiments of the present invention.

Figure 17:
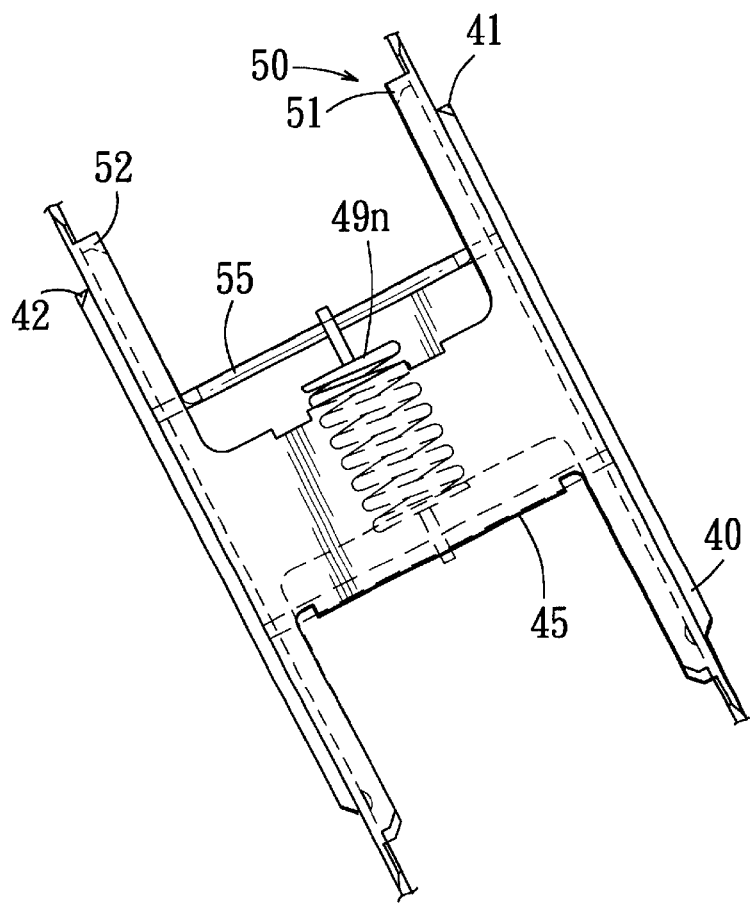
FIG. 17 is a fragmentary front view of the fifth preferred embodiment of a mounting device for a display according to the present invention.
Figure 18:
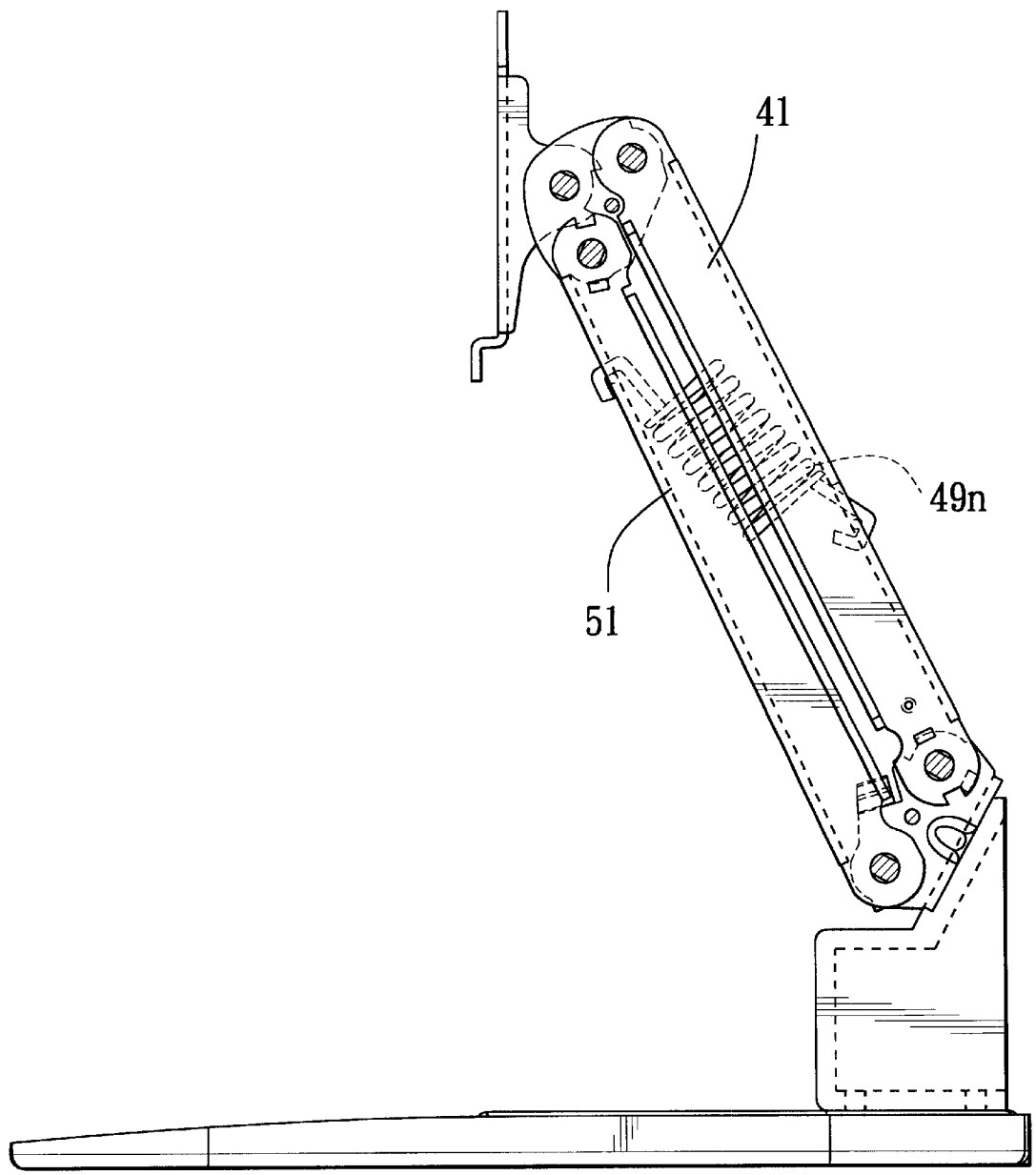
FIG. 18 is a schematic side view of the fifth preferred embodiment shown in FIG. 17.

Referring to FIGS. 17 and 18, the fifth preferred embodiment of a mounting device for a display according to the present invention is shown to have a construction similar to that of the first preferred embodiment. The main difference resides in that the urging unit 49 includes a compression spring 49n that has opposite upper and lower ends which respectively extend through and which are respectively secured to the first and second connecting ribs 45,55 of the first and second arm units 40,50 in such a manner that the compression spring 49n is compressed to store a restoring force when the display-supporting mechanism (4,5) (see FIG. 2) is turned to the lower position.

With this invention thus explained, it is apparent that numerous modifications and variations can be made without departing from the scope and spirit of this invention. It is therefore intended that the invention be limited only as indicated in the appended claims.

I claim:

1. A mounting device for a display, comprising:
   a stationary base; and
   a display-supporting mechanism extending upwardly from and pivoted to said stationary base so as to be rotatable relative to said stationary base between upper and lower positions, said display-supporting mechanism including a bracket that is disposed above said stationary base, and parallel first and second arm units that extend between and that are pivoted to said stationary base and said bracket, and that cooperatively define a gap therebetween; and
   an urging unit disposed between said stationary base and said bracket and connected to said first and second arm units in such a manner that rotation of said display-supporting mechanism relative to said stationary base from said upper position to said lower position results in widening of said gap, which, in turn, results in deformation of said urging member, thereby storing a restoring force in said urging unit to urge said display-supporting mechanism in a direction from said lower position to said upper position.

2. The mounting device of claim 1, wherein said stationary base is formed with opposite lower left and right pivot plates, said bracket being formed with opposite upper left and right pivot plates that are disposed above and that are aligned with said lower left and right pivot plates respectively, said first arm unit including parallel left and right arms, each of which extends between and is pivoted to a respective one of said lower left and right pivot plates and a respective one of said upper left and right pivot plates, said second arm unit including parallel left and right arms, each of which extends between and is pivoted to a respective one of said lower left and right pivot plates and a respective one of said upper left and right pivot plates, and each of which is aligned with and is spaced apart from a respective one of said left and right arms of said first arm unit by said gap, said urging unit including at least one torsion spring that has two opposite ends respectively connected to said left arms of said first and second arm units.

3. The mounting device of claim 2, wherein each of said left arms of said first and second arm units has a middle portion that is formed with an anchoring hole, each of said opposite ends of said torsion spring being formed with a barb that extends through said anchoring hole in a respective one of said left arms and that anchors at a periphery of said anchoring hole in the respective one of said left arms.

4. The mounting device of claim 2, wherein said urging unit further includes a second torsion spring that has two opposite ends which are respectively connected to said right arms of said first and second arm units.

5. The mounting device of claim 1, wherein said first arm unit further includes a first connecting rib that interconnects said left and right arms of said first arm unit, and an upper mounting plate that projects from said first connecting rib toward said second arm unit in a transverse direction transverse to said left and right arms of said first and second arm units, said second arm unit further including a second connecting rib that interconnects said left and right arms of said second arm unit, and a lower mounting plate that projects from said second connecting rib toward said first arm unit in said transverse direction, said upper and lower mounting plates cooperatively defining a spring-mounting space therebetween, and being respectively formed with upper and lower studs that project into said spring-mounting space toward each other, said urging unit including a compression spring that is sleeved on said upper and lower studs and that abuts against said upper and lower mounting plates in such a manner that said compression spring is compressed to store a restoring force when said display-supporting mechanism is turned to said lower position.

6. The mounting device of claim 1, wherein said first arm unit 40 further includes a first connecting rib that interconnects said left and right arms of said first arm unit, and an upper mounting plate that projects from said first connecting rib toward said second arm unit in a transverse direction transverse to said left and right arms of said first and second arm units, said second arm unit further including a second connecting rib that interconnects said left and right arms of said second arm unit, and a lower mounting plate that projects from said second connecting rib toward said first arm unit in said transverse direction, said urging unit including a torsion spring that has two opposite ends secured to said lower mounting plate, and a middle section extending from said opposite ends and abutting against said upper mounting plate.

7. The mounting device of claim 6, wherein said urging unit further includes a second torsion spring that has two opposite ends secured to said upper mounting plate, and a middle section extending from said opposite ends of said second torsion spring and abutting against said lower mounting plate.

8. The mounting device of claim 1, wherein said first arm unit further includes a first connecting rib that interconnects said left and right arms of said first arm unit, and an upper mounting plate that projects from said first connecting rib toward said second arm unit in a transverse direction transverse to said left and right arms of said first and second arm units, said second arm unit further including a second connecting rib that interconnects said left and right arms of said second arm unit, and a lower mounting plate that projects from said second connecting rib toward said first arm unit in said transverse direction, said urging unit including a pair of torsion springs, each of which has two opposite ends that are respectively secured to said upper and lower mounting plates.

9. The mounting device of claim 8, wherein each of said torsion springs has a middle section and two opposite end sections that diverge from said middle section, each of said opposite end sections of one of said torsion springs intersecting a respective one of said opposite end sections of the other of said torsion springs.

10. The mounting device of claim 1, wherein said first arm unit further includes a first connecting rib that interconnects said left and right arms of said first arm unit, said second arm unit further including a second connecting rib that interconnects said left and right arms of said second arm unit, said urging unit including a compression spring that has opposite upper and lower ends which are respectively secured to said first and second connecting ribs in such a manner that said compression spring is compressed to store a restoring force when said display-supporting mechanism is turned to said lower position.

* * * * *